(12) United States Patent
Liang

(10) Patent No.: US 6,445,823 B1
(45) Date of Patent: Sep. 3, 2002

(54) IMAGE COMPRESSION

(75) Inventor: Jie Liang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 726 days.

(21) Appl. No.: 08/816,222

(22) Filed: Mar. 12, 1997

(51) Int. Cl.⁷ .................................................. G06K 9/36

(52) U.S. Cl. ........................................................ 382/232

(58) Field of Search ................................... 382/232, 233, 382/239, 240, 246, 248; 358/426, 432

(56) References Cited

U.S. PATENT DOCUMENTS

| | | | | |
|---|---|---|---|---|
| 5,315,670 A | * | 5/1994 | Shapiro | 382/233 |
| 5,321,776 A | * | 6/1994 | Shapiro | 382/240 |
| 5,412,741 A | * | 5/1995 | Shapiro | 358/426 |
| 5,563,960 A | * | 10/1996 | Shapiro | 382/240 |
| 5,602,589 A | * | 2/1997 | Vishwanath et al. | 382/240 |
| 5,748,786 A | * | 5/1998 | Zandi et al. | 382/240 |

* cited by examiner

Primary Examiner—Jose L. Couso
(74) Attorney, Agent, or Firm—Carlton H. Hoel; W. James Brady; Frederick J. Telecky, Jr.

(57) ABSTRACT

A method of image encoding using subband decomposition followed by plus zerotree coding with a symbol replacement for significant coefficients.

1 Claim, 6 Drawing Sheets

IMAGE COMPRESSION

CROSS-REFERENCE TO RELATED APPLICATIONS

The following copending applications assigned to the assignee of this application disclose related subject matter: Ser. No. 08/746,702, filed Oct. 25, 1996.

BACKGROUND OF THE INVENTION

The invention relates to electronic image methods and devices, and, more particularly, to digital communication and storage systems with compressed images.

Video communication (television, teleconferencing, Internet, and so forth) typically transmits a stream of video frames (pictures, images) along with audio over a transmission channel for real time viewing and listening or storage. However, transmission channels frequently add corrupting noise and have limited bandwidth. Consequently, digital video transmission with compression enjoys widespread use. In particular, various standards for compression of digital video have emerged and include H.261, MPEG-1, and MPEG-2, with more to follow, including in development H.263 and MPEG4. There are similar audio compression methods.

Tekalp, Digital Video Processing (Prentice Hall 1995), Clarke, Digital Compression of Still Images and Video (Academic Press 1995), and Schafer et al, Digital Video Coding Standards and Their Role in Video Communications, 83 Proc. IEEE 907 (1995), include summaries of various compression methods, including descriptions of the H.261, MPEG-1, and MPEG-2 standards plus the H.263 recommendations and indications of the desired functionalities of MPEG4. These references and all other references cited are hereby incorporated by reference.

H.261 compression uses interframe prediction to reduce temporal redundancy and discrete cosine transform (DCT) on a block level together with high spatial frequency cutoff to reduce spatial redundancy. H.261 is recommended for use with transmission rates in multiples of 64 Kbps (kilobits per second) to 2 Mbps (megabits per second).

The H.263 recommendation is analogous to H.261 but for bitrates of about 22 Kbps (twisted pair telephone wire compatible) and with motion estimation at half-pixel accuracy (which eliminates the need for loop filtering available in H.261) and overlapped motion compensation to obtain a denser motion field (set of motion vectors) at the expense of more computation and adaptive switching between motion compensation with 16 by 16 macroblock and 8 by 8 blocks.

MPEG-1 and MPEG-2 also use temporal prediction followed by two dimensional DCT transformation on a block level as H.261, but they make further use of various combinations of motion-compensated prediction, interpolation, and intraframe coding. MPEG-1 aims at video CDs and works well at rates about 1–1.5 Mbps for frames of about 360 pixels by 240 lines and 24–30 frames per second. MPEG-1 defines I, P. and B frames with I frames intraframe, P frames coded using motion-compensation prediction from previous I or P frames, and B frames using motion-compensated bi-directional prediction/interpolation from adjacent I and P frames.

MPEG-2 aims at digital television (720 pixels by 480 lines) and uses bitrates up to about 10 Mbps with MPEG-1 type motion compensation with I, P. and B frames plus added scalability (a lower bitrate may be extracted to transmit a lower resolution image).

However, the foregoing MPEG compression methods result in a number of unacceptable artifacts such as blockiness and unnatural object motion when operated at very-low-bit-rates. Because these techniques use only the statistical dependencies in the signal at a block level and do not consider the semantic content of the video stream, artifacts are introduced at the block boundaries under very-low-bit-rates (high quantization factors). Usually these block boundaries do not correspond to physical boundaries of the moving objects and hence visually annoying artifacts result. Unnatural motion arises when the limited bandwidth forces the frame rate to fall below that required for smooth motion.

MPEG-4 is to apply to transmission bitrates of 10 Kbps to 1 Mbps and is to use a content-based coding approach with functionalities such as scalability, content-based manipulations, robustness in error prone environments, multimedia data access tools, improved coding efficiency, ability to encode both graphics and video, and improved random access. A video coding scheme is considered content scalable if the number and/or quality of simultaneous objects coded can be varied. Object scalability refers to controlling the number of simultaneous objects coded and quality scalability refers to controlling the spatial and/or temporal resolutions of the coded objects. Scalability is an important feature for video coding methods operating across transmission channels of limited bandwidth and also channels where the bandwidth is dynamic. For example, a content-scalable video coder has the ability to optimize the performance in the face of limited bandwidth by encoding and transmitting only the important objects in the scene at a high quality. It can then choose to either drop the remaining objects or code them at a much lower quality. When the bandwidth of the channel increases, the coder can then transmit additional bits to improve the quality of the poorly coded objects or restore the missing objects.

For encoding a single frame as in JPEG or an I frame in MPEG, Shapiro, Embedded Image Coding Using Zerotrees of Wavelet Coefficients, 41 IEEE Tr.Sig.Proc 3445 (1993) provides a wavelet hierarchical subband decomposition which groups wavelet coefficients at different scales and predicts zero coefficients across scales. This provides a quantization and fully embedded bitstream in the sense that the bitstream of a lower bitrate is embedded in the bitstream of higher bitrates.

Villasenor et al, Wavelet Filter Evaluation for Image Compression, 4 IEEE Tr.Image Proc. 1053 (1995) discusses the wavelet subband decomposition with various mother waveless.

However, more efficient coding at low bitrates remains a problem.

Hardware and software implementations of the JPEG, H.261, MPEG-1, and MPEG-2 compression and decoding exist. Further, programmable microprocessors or digital signal processors, such as the Ultrasparc or TMS320C6x, running appropriate software can handle most compression and decoding, and less powerful processors may handle lower bitrate compression and decompression.

SUMMARY OF THE INVENTION

The present invention provides video compression and decoding with embedded zerotree coding applied to a hierarchical decomposition (including wavelet) but with a special wild card symbol for significant coefficient replacement to use in successive scans; the wild card symbol is skipped on coding but evaluates as a zero during threshold comparisons.

This has the advantage of decreasing the bits required for coding with little compensation required in a decoder and can be used for JPEG or MPEG I frames or objects.

The present invention also provides video systems with applications for this coding, such as video telephony and fixed camera surveillance for security, including time-lapse surveillance, with digital storage in random access memories.

BRIEF DESCRIPTION OF THE DRAWINGS

The drawings are schematic for clarity.

DESCRIPTION OF THE PREFERRED EMBODIMENTS

Single Frame Modified Zerotree Preferred Embodiment

Figure 1:
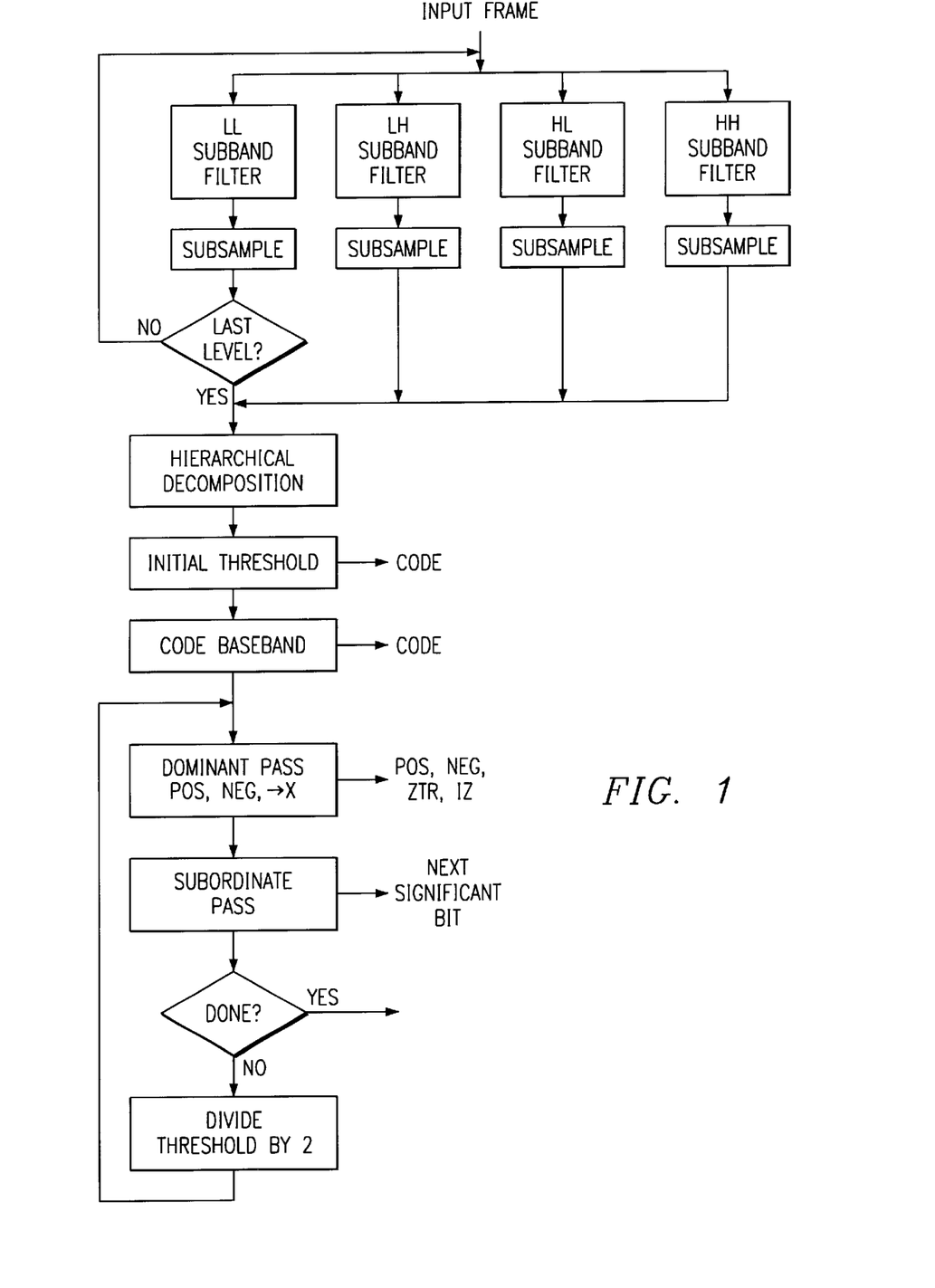
FIG. 1 is a flow diagram for a preferred embodiment encoding.

FIG. 1 is a flow diagram of a first preferred embodiment image or frame encoding using wavelet hierarchical decomposition. The flow diagram will be explained with the help of an example for simplicity; thus presume a frame of 144 rows of 176 pixels with 8-bit pixels (−128 to +127) and presume four scale levels in a wavelet hierarchical decomposition. The value of the pixel at (j,k) may be denoted x(j,k) for $0 \leq j \leq 143$ and $0 \leq k \leq 175$.

To begin the hierarchical decomposition, first filter the 144 by 176 frame with each of the four filters $h_0(j)h_0(k)$, $h_0(j)h_1(k)$, $h_1(j)h_0(k)$, and $h_1(j)h_1(k)$, to give 144 by 176 filtered frames (boundary pixel values are used to extend the frame for computations which otherwise would extend beyond the frame). A computationally simple $h_0(k)$ function equals $1/\sqrt{2}$ at k=0,1, and is zero for all other k; $h_1(k)$ equals $1/\sqrt{2}$ at k=0, $-1/\sqrt{2}$ at k=1, $1/8\sqrt{2}$ at k=2,3, $-1/8\sqrt{2}$ at k=−1,−2, and zero for all other k. The Villasenor article cited in the Background lists other filter functions. The filtering is mathematically convolution with the functions, so $h_0$ is a lowpass filter in one dimension (averages over two adjacent pixels) and $h_1$ is a highpass filter in one dimension (essentially a difference of adjacent pixels). Thus the four filters are two-dimensional lowpass-lowpass, lowpass-highpass, highpass-lowpass, and highpass-highpass, respectively.

Figure 2A:
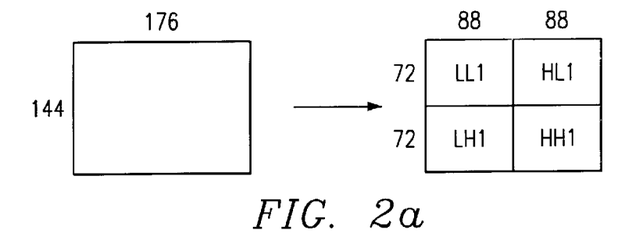
FIGS. 2a–c illustrates subband hierarchical decomposition.
Figure 2B:
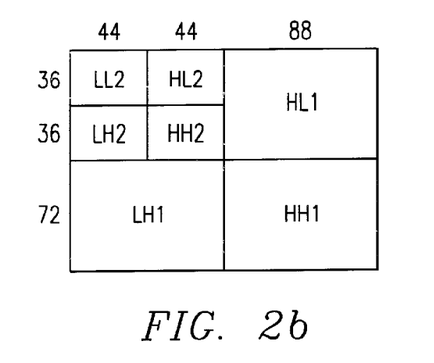

Next, subsample each filtered frame by a factor of four by retaining only pixels at (j,k) with j and k both even integers. This subsampling will yield four 72 by 88 subarrays of wavelet coefficients, denoted LL1, LH1, HL1, and HH1, respectively, with coefficient locations (j,k) relabelled for $0 \leq j \leq 71$ and $0 \leq k \leq 87$. This forms tne first level of tne decomposition, and the four subarrays can be placed together to form a single 144 by 176 array which makes visualization of the decomposition simple as illustrated in FIG. 2a. Thus LL1 is a lower resolution version of the original frame and could be used as a compressed version of the original frame. The values of the pixels in these filtered and subsampled images are the first level wavelet coefficients.

The LL1, LH1, HL1, and HH1 subarrays can be used to reconstruct the original frame by first interpolating each subarray by a factor of four (to restore the 144 by 176 size), then filtering the four 144 by 176 arrays with filters $g_0(j)g_0(k)$, $g_0(j)g_1(k)$, $g_1(j)g_0(k)$, and $g_1(j)g_1(k)$, respectively, and lastly pixelwise adding these four filtered images together. The functions $g_0$ and $g_1$ are lowpass and highpass filters, respectively, and relate to $h_0$ and $h_1$ by $g_0(n)=(-1)^n h_1(n)$ and $g_1(n)=(-1)^n h_0(n)$. The $h_0$, $h_1$, $g_0$, and $g_1$ functions are symmetric about ½, rather than about 0 as would be the case for an odd tap filter, so after reconstruction the pixel index is shifted by 1 to adjust for the two ½ pixel shifts during two filterings.

The second level in the decomposition simply repeats the four filterings with the $h_0$ and $h_1$ functions plus subsampling by a factor of four but using the LL1 subarray as the input. Thus the four filtered subarrays are each 36 by 44 and denoted LL2, LH2, HL2, and HH2. As before, the LL2, LH2, HL2, and HH2 can be arranged to visualize the decomposition of LL1 and also could be used for reconstruction of LL1 with the $g_0$ and $g_1$ based filters. The LH1, HL1, and HH1 subarrays of first level coefficients remain unfiltered.

Repeat this decomposition on LL2 by filtering with the four filters based on $h_0$ and $h_1$ followed by subsampling to obtain LL3, LH3, HL3, and HH3 which are 18 by 22 coefficient subarrays. Again, LL3, LH3, HL3, and HH3 can be arranged to visualize the decomposition of LL2.

Figure 2C:
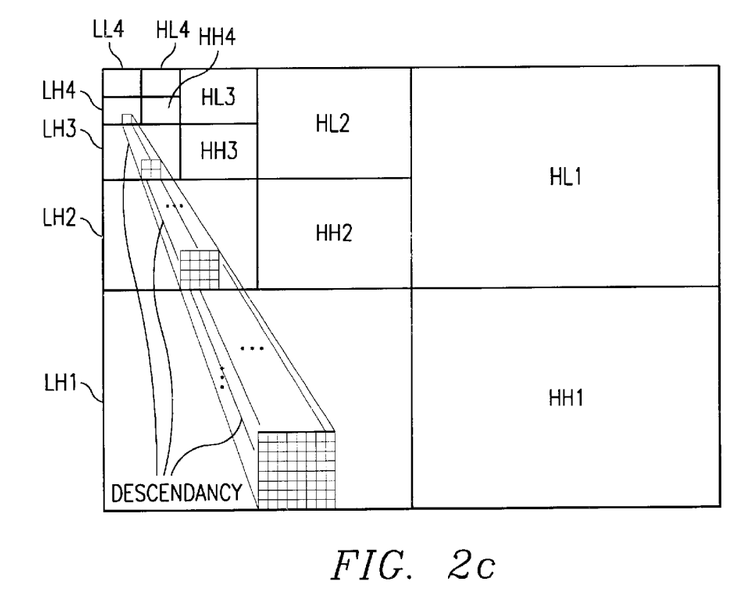

Complete the hierarchical four level decomposition of the original frame by a last filtering with the four filters based on $h_0$ and $h_1$ followed by subsampling of LL3 to obtain LL4, LH4, HL4, and HH4 which are each a 9 rows of 11 coefficients subarray. FIG. 2c illustrates all of the resulting subarrays arranged to form an overall 144 by 176 coefficient array. FIG. 2c also indicates the tree relation of coefficients in various levels of the decomposition; indeed, a coefficient w(j,k) in LH4 is the result of filtering and subsampling of coefficients x(j,k) in LL3:

$$\begin{aligned}w(j,k) = &\, h_0(0)h_1(0) \times (2j, 2k) + h_0(0)h_1(1) \times (2j, 2k-1) \\ &\, h_0(0)h_1(-1) \times (2j, 2k+1) + h_0(0)h_1(2) \times (2j, 2k-2) \\ &\, h_0(0)h_1(-2) \times (2j, 2k+2) + h_0(0)h_1(3) \times (2j, 2k-3) \\ &\, h_0(1)h_1(0) \times (2j-1, 2k) + h_0(1)h_1(1) \times (2j-1, 2k-1) \\ &\, h_0(1)h_1(-1) \times (2j-1, 2k+1) + h_0(1)h_1(2) \times (2j-1, 2k-2) \\ &\, h_0(1)h_1(-2) \times (2j-1, 2k+2) + h_0(1)h_1(3) \times (2j-1, 2k-3)\end{aligned}$$

Because the filtering plus subsampling is basically computing w(j,k) from the 2 by 2 area in LL3 (the values of $h_1(k)$ are small except for k==0,1), there are four coefficients (x(2j−1,2k−1), x(2j−1,2k), x(2j,2k−1) and x(2j,2k)) in LL3 which determine w(j,k) in LH4. Now each of these four coefficients in LL3 is related to a corresponding one of the four coefficients in LH3 at the same positions ((2j−1, 2k−1), (2j−1,2k), (2j,2k−1) and (2j,2k)) because they were computed from essentially the same 4 by 4 location in LL2. Thus the coefficient w(j,k) in LH4 is called the parent of the four related coefficients z(2j−1,2k−1), z(2j−1,2k), z(2j,2k−1) and z(2j,2k) in LH3 and each of these four coefficients in LH3 is a child of the parent coefficient in LH4. This terminology extends to LH2 and LH1. The generic term descendant includes children, children of children, and so forth. See FIG. 2c showing descendants.

Using the hierarchical decomposition of the original frame into coefficient subarrays LL4, LH4, ..., HH1, begin the modified embedded zerotree encoding: first find the maximum of the magnitudes of the coefficients w(j,k) in the coefficient array (union of subarrays LL4, LH4, HL4, ... LH1, HL1, HH1) except exclude the coefficients in LL4 which will be separately encoded. Then pick an initial quantization threshold, $T_0$, so that $$T_0 \leq \max|w(j,k)| \leq 2T_0$$

The initial threshold value, $T_0$, is encoded (with a variable length code) and made part of the bitstream.

Embedded zerotree encoding essentially encodes w(j,k) by using a binary expansion of $w(j,k)/T_0$ with successive scans of the coefficient array adding successive bits in the expansion. This provides a fully embedded bitstream with resolution increasing over an entire reconstructed image on each scan of the array. For example, a background transmitted over the Internet could be improved with updates between data transmissions. Scan the wavelet coefficient array in the order of lowpass to highpass; that is, the subarrays are scanned in the order of LH4, HL4, ..., HL1, HH1 with each subarray raster scanned (a row at a time). Thus the decoder receiving a transmitted bitstream can determine wavelet coefficient location in the coefficient array by order in the bitstream.

First code the baseband LL4 with DPCM or PCM; LL4 has no descendant coefficients and simple zerotree coding does not have any gain over PCM. Indeed, PCM codes each of the 99 (9 by 11) coefficients individually, and successive bit planes (one bit from each of the 99 coefficients) provide successively better resolution. Thus PCM can be part of a fully embedded bitstream syntax. DPCM uses fewer bits because the coefficients are coded as differences from adjacent coefficients, but this disrupts full embedding. LL4 is basically a low resolution version of the original frame (each wavelet coefficient is essentially an average of the pixels in a 16 by 16 macroblock), thus putting a DPCM coded LL4 near the front of the bitstream is practical. FIG. 1 shows the case of DPCM coding LL4; for PCM with full embedding, the looping with threshold decrementing would include the code baseband block.

Figure 3A:
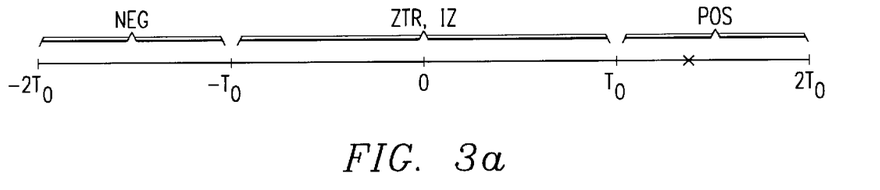
FIGS. 3a–d show coefficient encoding.

Next, raster scan subarray LH4 and encode each of the 99 wavelet coefficients to indicate which of the following four classes w(j,k) falls into: (i) POS (positive significant) if $w(j,k) \geq T_0$, (ii) NEG (negative significant) if $w(j,k) \leq -T_0$, (iii) ZTR (zerotree root) if $|w(j,k)| > T_0$ and all descendants of w(j,k) (4 in LH3, 16 in LH2, and 64 in LH1) also have magnitudes less than $T_0$, and (iv) IZ (isolated zero) if $|w(j,k)| < T_0$ but at least one of the descendant wavelet coefficients has magnitude not less than $T_0$. The 99 coefficients in LH4 are raster scanned, and the encoding generates 198 bits if each coefficient takes two bits or, preferably, generates fewer bits if an adaptive arithmetic coding is used. Note that if a wavelet coefficient in LH4 is encoded as ZTR, then the decoder determines that all of the descendant wavelet coefficients have magnitude less than $T_0$ and so these coefficients need not be coded in this scan of the coefficient array because they are already known to be insignificant. FIG. 3a illustrates the range of coefficient values and codes associated with them. Also, start a list of significant coefficients and append w(j,k) to the list if w(j,k) is coded as either POS or NEG plus replace it with symbol X in the LH4 subarray. On successive scans of the coefficient array additional bits from the binary expansion of these coefficients on the list of significant coefficient will be coded. The decoder reconstructs the coefficients from the successive bits by knowing the scan order and the array locations from the initial POS and NEG codes. Also, on successive scans the threshold is divided by powers of 2, so the wavelet coefficients initially encoded as ZTR or IZ may be further resolved as POS or NEG and appended to the list.

X evaluates as a 0 for threshold comparisons (i.e., as in checking to see whether a parent coefficient is a ZTR or an IZ) but is skipped rather than coded as a 0 (i.e, as a ZTR or IZ) on successive scans. This use of symbol X rather than a 0 as the replacement for a removed significant coefficient implies fewer coefficients may be needed for coding on subsequent scans of the array. There is a tradeoff between (1) using the X symbol as the replacement for significant coefficients which codes fewer bits by skipping the X symbols on successive scans and (2) using a 0 as the replacement for significant coefficients which will save bits when the 0 is found to be a zerotree root.

Continue with the same coding (POS, NEG, ZTR, or IZ) for the raster scan of HL4 and then of HH4 along with the appending to the list of significant coefficient plus replacing by X of coefficients coded as POS or NEG.

After completing the fourth level coefficient subarrays, continue the scanning and encoding for the third level subarrays LH3, HL3, and HH3. In scans of these subarray a wavlet coefficient which has a parent coded as ZTR is just skipped; the decoder knows the locations of all descendants of a ZTR.

Figure 4:
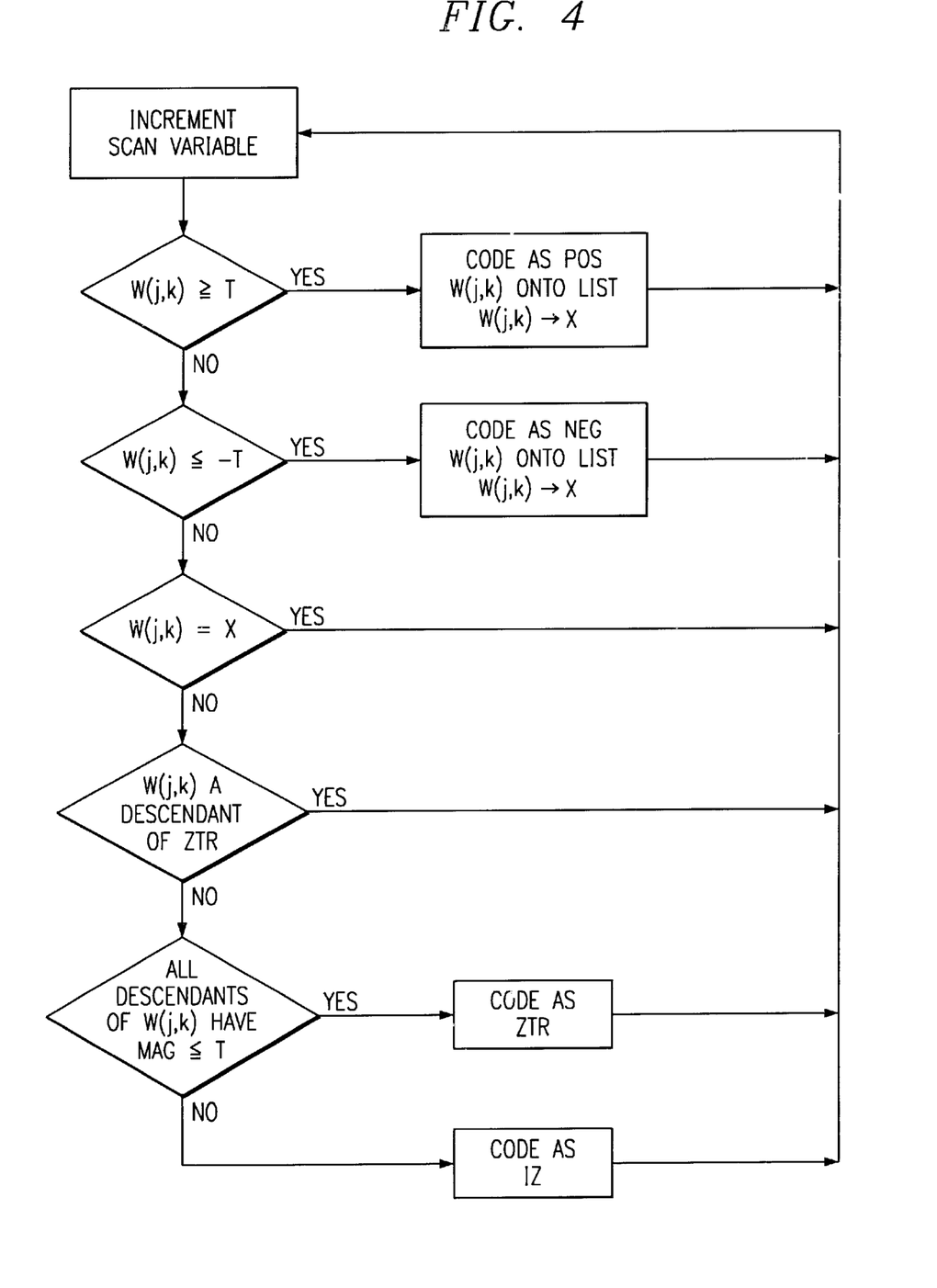
FIG. 4 is a flow diagram for a dominant pass.

Similarly, scan and encode the remaining subarrays in order LH2, HL2, HH2, LH1, HL1, and HH1 along with the appending to the significant coefficient list and replacement by symbol X for the coefficients coded as either POS or NEG. FIG. 4 is a flow diagram of the entire array scan where the "increment scan variable" means raster scan of the subarrays in order. The array scan and coding is termed a dominant pass through the array.

The decoder may reconstruct a frame from the coefficient codes by using a values of $\pm 3T_0/2$ for coefficients coded POS or NEG and a value of 0 for coefficients coded ZTR or IZ. This encoding essentially is a map of the location (and sign) of significant coefficients (greater than threshold).

Figure 3B:
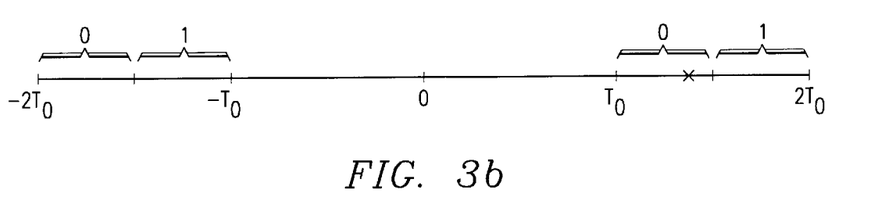

Next, encode the members of the list of significant coefficients in a subordinate pass in which each member has one more bit coded as follows: if w(j,k) was previously coded as POS (which means $T_0 \leq w(j,k) < 2T_0$), then code a 0 for $T_0 \leq w(j,k) < 3T_0/2$ and a 1 for $3T_0/2 < w(j,k) < 2T_0$. Similarly for w(j,k) coded as NEG, code a 0 for $-2T_0 < w(j,k) \leq -3T_0/2$ and a 1 for $-3T_0/2 < w(j,k) \leq -T_0$. Note these are just the second most significant bits in the binary expansion of $w(j,k)/T_0$; POS and NEG would be the sign and most significant bits (with negative numbers in two's complement format). FIG. 3b heuristically illustrates the range of codes.

Figure 3C:
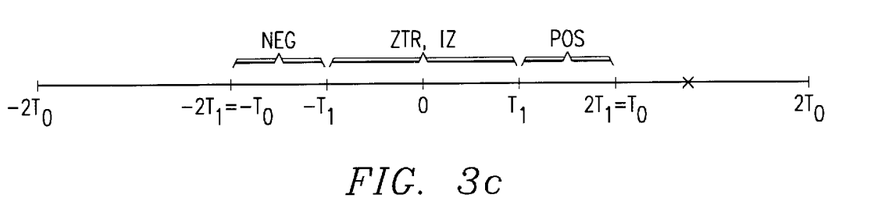
Figure 3D:
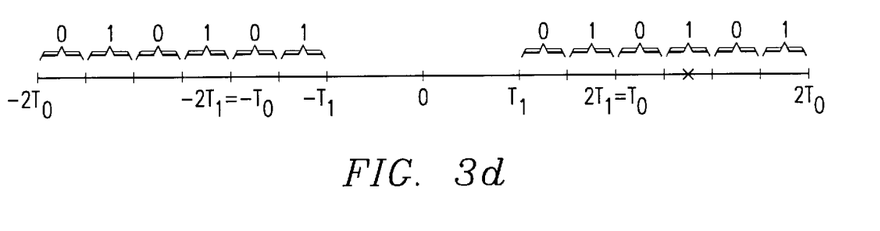

After completing the foregoing scan and POS-NEG-ZTR-IZ-skip coding (a dominant pass through the coefficient array) plus the additional bit for the members of the significant coefficient list (subordinate pass), replace $T_0$ by $T_1 = T_0/2$ and repeat the dominant pass and subordinate pass with $T_1$ as the threshold. FIG. 3c illustrates the coefficient ranges for the dominant pass, and FIG. 3d illustrates the subordinate pass. The dominant pass typically appends more coefficients to the list of significant coefficients plus replaces them with Xs, and the subordinate pass adds an additional bit of resolution for each members of the list. During the dominant pass, the X value of a coefficient in the array is treated as a 0 for threshold comparisons but is skipped rather than being encoded as either a ZTR or a IZ. On the average this use of X decreases the number of bits that need to be transmitted; see FIG. 5 illustrating experimental results of the gain using X in connection with the preferred embodiment.

This successive decreases in the quantization threshold provides increasingly higher resolution reconstructions of the original frame. Further, if the initial threshold, $T_0$, may be selected for computational convenience provided in lies the the range of half the coefficient maximum to the coefficient maximum.

Experimental Results

Figure 5:
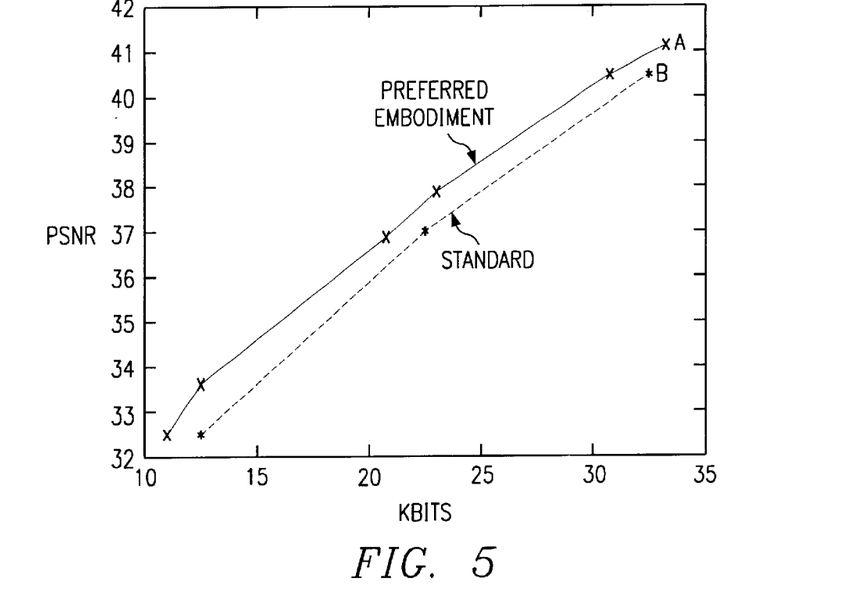
FIG. 5 indicates empirical results.

FIG. 5 illustrates the improvement in PSNR at various transmission bitrates from using the preferred embodiment modified zerotree (using symbol X) over the standard zerotree with the baseband separately DPCM encoded and with the following 9-3 tap Daubechies filter functions for the hierarchical decomposition:

$$h_0 = [0.03314563036812, -0.06629126073624, -0.17677669529665,$$
$$0.41984465132952, 0.99436891104360, 0.41984465132952,$$
$$-0.17677669529665, -0.06629126073624, 0.03314563036812]$$
$$h_1 = [0.35355339059327, 0.70710678118655, 0.35355339059327]$$

The overall bitstream thus has an initial block of bits fully encoding LL4, then a block of bits encoding significant coefficient location using initial quantization thresholds, then a block of bits adding one bit accuracy to each of the significant pixels, then a block of bits encoding newly-significant coefficient location using refined quantization thresholds, then a block of bits adding one bit accuracy to each of the significant coefficients (both with initial quantization thresholds and refined thresholds), and so forth until target quantization refinement or other bitstream size or bitrate constraint occurs.

The Appendix lists program code for an implementation of the preferred embodiment.

Separate Threshold Preferred Embodiment

The three sets of subarrays (LH4, LH3, LH2, plus LH1; HL4, HL3, HL2, plus HL1; and HH4, HH3, HH2, plus HH1) could each have its own initial threshold determined by the maximum coefficient magnitude in that set of subarrays.

Baseband Zerotree Preferred Embodiment

Rather than separately coding the baseband, a zerotree type coding can be used as follows. Raster scan LL4 and encode each of the 99 wavelet coefficients w(j,k) with two bits to indicate which of the following four classes w(j,k) falls into: (i) POS (positive significant) if $w(j,k) > T_0$, (ii) NEG (negative significant) if $w(j,k) < -T_0$, (iii) ZTR (zerotree root) if $|w(j,k)| < T_0$ and the three coefficients at the analogous location in LH4, HL4, and HH4 is a zerotree root (this allows these three ZTRs to be skipped in the scanning of LH4, HL4, and HH4). LL4 differs from the remaining subarrays because LL4 wavelet coefficients have no descendants, but in a dark background, both highpass and lowpass coefficients will be small, so a ZTR in LL4 may provide a coding gain. Also, start the list of significant coefficients with the scan of LL4, and append w(j,k) to the list if w(j,k) is coded as either POS or NEG plus replace it with X in the LL4 subarray for successive scans.

Three Dimensional Zerotree

Three dimensional zerotree coding, as could be used for a sequence of video frames treated as a single three-dimensional image, preferred embodiments follow the same approach but with pixels x(i,j,k) filtered by eight filters rather than four: $h_0(i)h_0(j)h_0(k)$, $h_0(i)h_0(j)h_1(k)$, ..., $h_1(i)h_1(j)h_1(k)$, to yield a hierarchical decomposition such as LLL4, LLH4, LHL4, HLL4, LHH4, HLH4, HHL4, HHH4, LLH3, ... HHH1 for four levels. Again, the baseband LLL4 may be separately coded with DPCM, PCM, or other technique, and the preferred embodiment modified zerotree approach applied to the remaining subarrays. The scan again is in the order of this decomposition, and each subarray of wavelet coefficients is again scanned by looping one variable at a time.

System Preferred Embodiments

Figure 6:
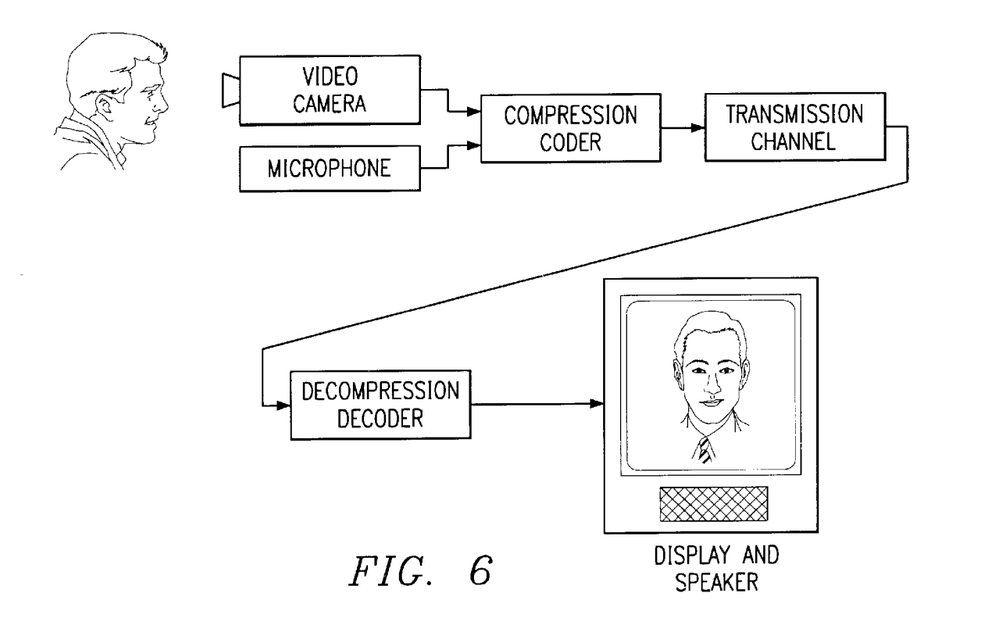
FIG. 6 shows a preferred embodiment telephony system.

FIG. 6 illustrates in block diagram a preferred embodiment video-telephony (teleconferencing) system which transmits both speech and an image of the speaker using one of the foregoing preferred embodiment modified zerotree image compressions (either as individual images or as I frames in an MPEG type video compression), encoding, decoding, and decompression including error correction with the encoding and decoding. Of course, FIG. 6 shows only transmission in one direction and to only one receiver; in practice a second camera and second receiver would be used for transmission in the opposite direction and a third or more receivers and transmitters could be connected into the system. The video and speech are separately compressed and the allocation of transmission channel bandwidth between video and speech may be dynamically adjusted depending upon the situation. The costs of telephone network bandwidth demand a low-bit-rate transmission. Indeed, very-lowbit-rate video compression finds use in multimedia applications where visual quality may be compromised.

Figure 7:
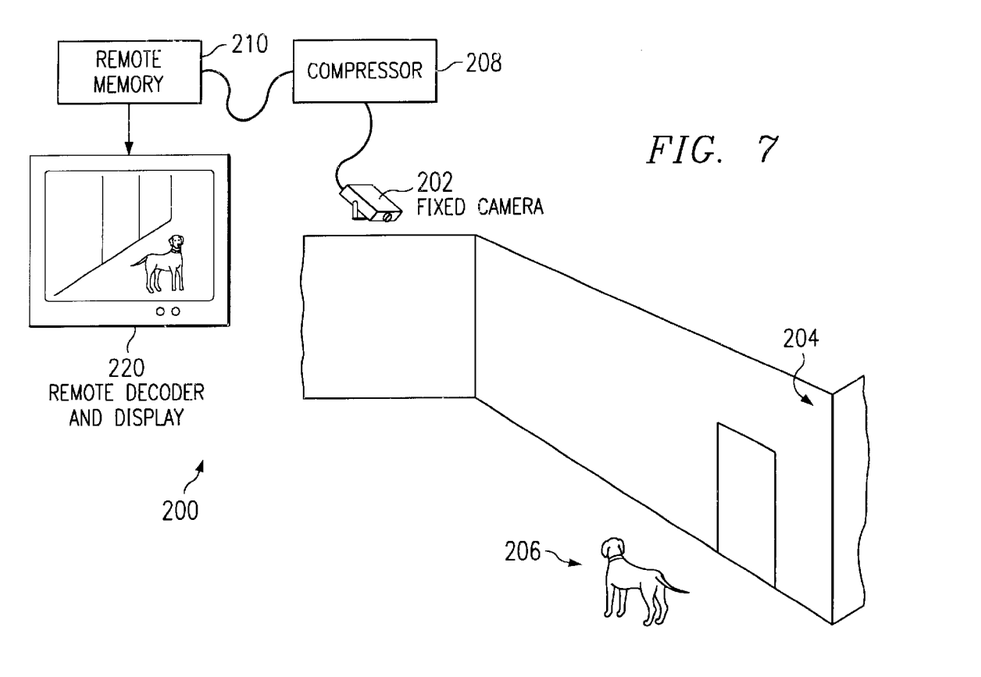
FIG. 7 illustrates a preferred embodiment surveillance system.

FIG. 7 shows a first preferred embodiment surveillance system, generally denoted by reference numeral 200, as comprising one or more fixed video cameras 202 focused on stationary background 204 (with occasional moving objects 206 passing in the field of view) plus video compressor 208 together with remote storage 210 plus decoder and display 220. Compressor 208 provides compression of the stream of video images of the scene (for example, 30 frames a second with each frame 144 by 176 8-bit monochrome pixels) so that the data transmission rate from compressor 208 to storage 210 may be very low, for example 22 Kbits per second, while retaining high quality images. System 200 relies on the stationary background and only encodes moving objects (which appear as regions in the frames which move relative to the background) with predictive motion to achieve the low data rate. This low data rate enables simple transmission channels from cameras to monitors and random access memory storage such as magnetic hard disk drives available for personal computers. Indeed, a single telephone line with a modem may transmit the compressed video image stream to a remote monitor. Further, storage of the video image stream for a time interval, such as a day or week as required by the particular surveillance situation, will require much less memory after such compression.

Video camera 202 may be a CCD camera with an incamera analog-to-digital convertor so that the output to compressor 208 is a sequence of digital frames as generally illustrated in FIG. 5; alternatively, analog cameras with additional hardware may be used to generate the digital video stream of frames. Compressor 208 may be hardwired or, more conveniently, a digital signal processor (DSP) with the compression steps stored in onboard memory, RAM or ROM or both. For example, a TMS320C5xx or TMS320C6x type DSP may suffice. Also, for a teleconferencing system as shown in FIG. 6, error correction with real time reception may be included and implemented on general purpose processors.

Figure 8:
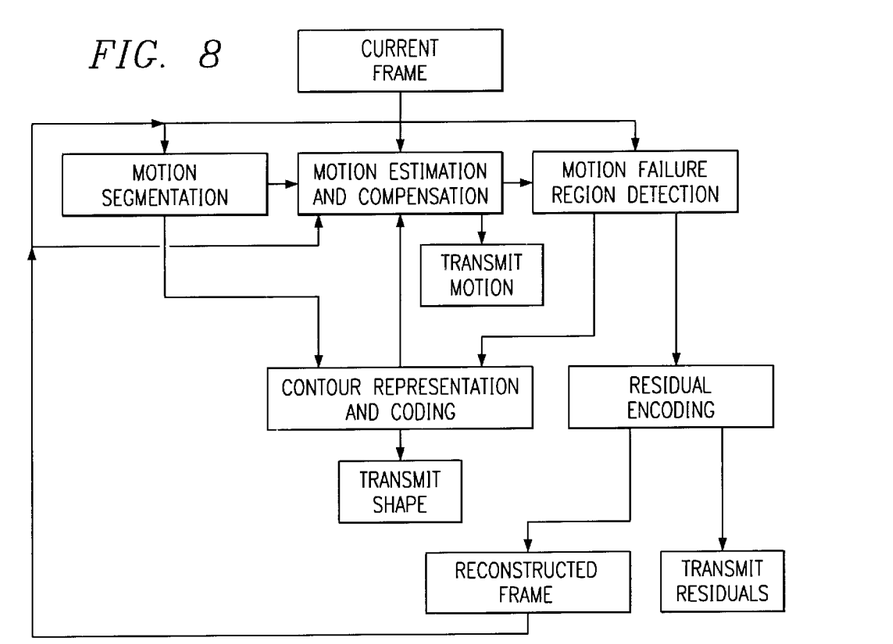
FIG. 8 is a flow diagram for a preferred embodiment video compression.

FIG. 8 shows a high level flow diagram for the preferred embodiment video compression methods which include the following steps for an input consisting of a sequence of frames, Fo F1, F2, . . . , with each frame 144 rows of 176 pixels or 288 rows of 352 pixels and with a frame rate of 10 frames per second. Details of the steps appear in the following sections.

Frames of these two sizes partition into arrays of 9 rows of 11 macroblocks with each macroblock being 16 pixels by 16 pixels or 18 rows of 22 macroblocks. The frames will be encoded as I pictures or P pictures; B pictures with their backward interpolation would create overly large time delays for very low bitrate transmission. An I picture occurs only once every 5 or 10 seconds, and the majority of frames are P pictures. For the 144 rows of 176 pixels size frames, roughly an I picture will be encoded with 20 Kbits and a P picture with 2 Kbits, so the overall bitrate will be roughly 22 Kbps (only 10 frames per second or less). The frames may be monochrome or color with the color given by an intensity frame (Y signal) plus one quarter resolution (subsampled) color combination frames (U and V signals).

(1) Initially, encode the zeroth frame Of as an I picture as in MPEG using a preferred embodiment based on wavelet transform and modified zerotree coding. Compute the multi-level decomposition of the frame; optionally separate the baseband and encode it with PCM or DPCM (PCM provides simple full embbedding); for each of the three sets of higher bands (HH1, HH2, . . . HHk; HL1, HL2, . . . HLk; and LH1, LH2, . . . LHk) separately preferred embodiment modified zerotree encode the wavelet coefficients; and transmit in scan line order with the PCM of LLk interleaved for full embedding. Other frames will also be encoded as I frames with the proportion of I frames dependent upon the transmission channel bitrate. If Fn is to be an I picture, encode in the same manner as Of.

(2) For frame Fn to be a P picture, detect moving objects in the frame by finding the regions of change from reconstructed Fn−1 to Fn. Reconstructed Fn−1 is the approximation to F'n−1 which is actually transmitted as described below. Note that the regions of change need not be partitioned into moving objects plus uncovered background and will only approximately describe the moving objects. However, this approximation suffices and provides more efficient low coding. Of course, an alternative would be to also make this partition into moving objects plus uncovered background through mechanisms such as inverse motion vectors to determine if a region maps to outside of the change region in the previous frame and thus is uncovered background, edge detection to determine the object, or presumption of object characteristics (models) to distinguish the object from background.

(3) For each connected component of the regions of change from step (2), code its boundary contour, including any interior holes. Thus the boundaries of moving objects are not exactly coded; rather, the boundaries of entire regions of change are coded and approximate the boundaries of the moving objects. The boundary coding may be either by splines approximating the boundary or by a binary mask indicating blocks within the region of change. The spline provides more accurate representation of the boundary, but the binary mask uses a smaller number of bits. Note that the connected components of the regions of change may be determined by a raster scanning of the binary image mask and sorting pixels in the mask into groups, which may merge, according to the sorting of adjacent pixels. The final groups of pixels are the connected components (connected regions). For example of a program, see Ballard et al, Computer Vision (Prentice Hall) at pages 149–152. For convenience in the following the connected components (connected regions) may be referred to as (moving) objects.

(4) Remove temporal redundancies in the video sequence by motion estimation of the objects from the previous frame. In particular, match a 16 by 16 block in an object in the current frame FN with the 16 by 16 block in the same location in the preceding reconstructed frame Fn−1 plus translations of this block up to 15 pixels in all directions. The best match defines the motion vector for this block, and an approximation F'n to the current frame Fn can be synthesized from the preceding frame Fn−1 by using the motion vectors with their corresponding blocks of the preceding frame.

(5) After the use of motion of objects to synthesize an approximation F'n there may still be areas within the frame which contain a significant amount of residual information, such as for fast changing areas. That is, the regions of difference between Fn and the synthesized approximation Fn have motion segmentation applied analogous to the steps (2)–(3) to define the motion failure regions which contain significant information.

(6) Encode the motion failure regions from step (5) using a waveform coding technique based on the DCT or wavelet transform. For the DCT case, tile the regions with 16 by 16 macroblocks, apply the DCT on 8 by 8 blocks of the macroblocks, quantize and encode (runlength and then Huffman coding). For the wavelet case, set all pixel values outside the regions to a constant (e.g., zero), apply the multi-level decomposition, quantize and encode (zerotree and then arithmetic coding) only those wavelet coefficients corresponding to the selected regions.

(7) Assemble the encoded information for I pictures (DCT or wavelet data) and P pictures (objects ordered with each object having contour, motion vectors, and motion failure data). These can be codewords from a table of Huffman codes; this is not a dynamic table but rather generated experimentally.

(8) Insert resynchronization words at the beginning of each I picture data, each P picture, each contour data, each motion vector data, and each motion failure data. These resynchronization words are unique in that they do not appear in the Huffman codeword table and thus can be unambiguously determined.

(9) Encode the resulting bitstream from step (8) with Reed-Solomon codes together with interleaving. Then transmit or store.

(10) Decode a received encoded bitstream by Reed-Solomon plus deinterleaving. The resynchronization words help after decoding failure and also provide access points for random access. Further, the decoding may be with shortened Reed-Solomon decoders on either side of the deinterleaver plus feedback from the second decoder to the first decoder (a stored copy of the decoder input) for enhanced of error correction.

(11) Additional functionalities such as object scalability (selective encoding/decoding of objects in the sequence) and quality scalability (selective enhancement of the quality of the objects) which result in a scalable bitstream are also supported.

Modifications

The preferred embodiments may be varied in many ways while retaining one or more of their features of zerotree coding with a wildcard symbol used for replacement of significant coefficients.

For example, the size of the images or frames, the number of decomposition levels, the initial thresholds, quantization levels, symbols, and so forth can be changed. Generally, subband filtering of other types such as QMF and Johnston could be used in place of the wavelet filtering provided that the region-of-interest based approach is maintained. Images (data structures) with one or four or more dimensions can analogously be encoded by subband decomposition and modified zerotree coding applied.

What is claimed is:

1. A method of encoding an image, comprising the steps of:
  (a) decomposing an image into subarrays of coefficients by lowpass and highpass filtering and subsampling;
  (b) encoding the subarrays with a zerotree coding including a symbol replacement for significant coefficients, wherein said symbol is evaluated as zero for threshold comparison but is not coded.

* * * * *